United States Patent [19]

Morita et al.

[11] Patent Number: 4,642,719

[45] Date of Patent: * Feb. 10, 1987

[54] MAGNETIC HEAD ASSEMBLY

[75] Inventors: Shigetoshi Morita, Saitama; Masaaki Ashizawa, Fukaya; Hirohide Yamada, Kumagaya, all of Japan

[73] Assignee: Hitachi Metals, Ltd., Tokyo, Japan

[*] Notice: The portion of the term of this patent subsequent to Mar. 19, 2002 has been disclaimed.

[21] Appl. No.: 467,287

[22] Filed: Feb. 17, 1983

[30] Foreign Application Priority Data

Feb. 18, 1982 [JP] Japan ............................. 57-24802
Feb. 18, 1982 [JP] Japan ............................. 57-24808
Feb. 18, 1982 [JP] Japan ............................. 57-24811
Feb. 18, 1982 [JP] Japan ............................. 57-24823

[51] Int. Cl.$^4$ ........................... G11B 5/22; G11B 5/16
[52] U.S. Cl. ..................................... 360/126; 360/118; 360/121
[58] Field of Search ................ 360/125, 110, 118–122, 360/126–127; 318/634

[56] References Cited

U.S. PATENT DOCUMENTS 4,058,846  11/1977  Knutson et al. ................ 360/121
4,441,132   4/1984  Morita et al. .................. 360/118
4,506,308   3/1985  Furnichi et al. ............... 360/118

FOREIGN PATENT DOCUMENTS 31763    4/1975  Japan .
0000810  2/1976  Japan .
0026915  2/1979  Japan .
22816    2/1979  Japan .
143217  11/1979  Japan .

Primary Examiner—John H. Wolff
Assistant Examiner—David J. Severin
Attorney, Agent, or Firm—Finnegan, Henderson, Farabow, Garrett & Dunner

[57] ABSTRACT

A magnetic head assembly has, at least, a recording/reproducing magnetic head made of an Mn-Zn ferrite, a first reinforcer made of a non-magnetic ceramic material and bonded by a glass to the recording/reproducing magnetic head in parallel with the gap formed in the recording/reproducing magnetic head, erasing magnetic heads attached to both sides of the first reinforcer so as to limit the recording width of the recording/reproducing magnetic head, and second reinforcers made of a non-magnetic ceramic material and bonded in parallel to gaps in the erasing magnetic heads, the second reinforcers being positioned at both sides of said recording/reproducing magnetic head. The area Af defined by the thermal expansion coefficient curve of the Mn-Zn ferrite in the temperature range between the normal room temperature and the softening point of the bonding glass and the area Ac defined by the thermal expansion coefficient curve of the first reinforcer in the same temperature range satisfy the following condition:

$$-3.8 \times 10^{-4} \leq Af - Ac \leq 1.8 \times 10^{-4}.$$

9 Claims, 7 Drawing Figures

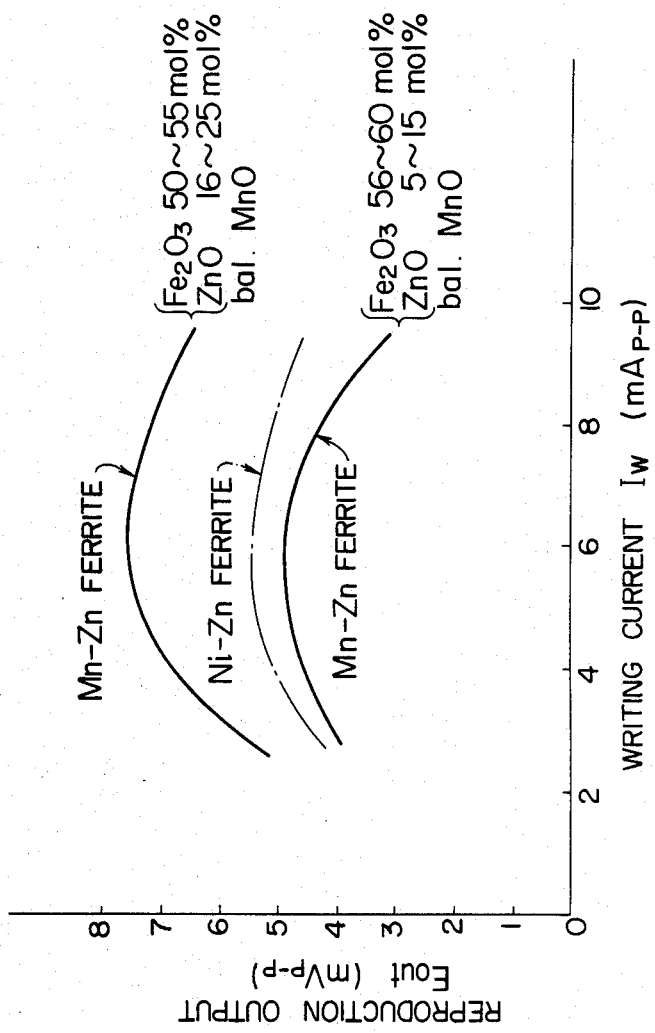

MAGNETIC HEAD ASSEMBLY

BACKGROUND OF THE INVENTION

The present invention relates to a novel construction of a magnetic head assembly having a recording/reproducing magnetic head and erasing magnetic head for limiting the recording width of the recording/reproducing magnetic head. More particularly, the invention is concerned with a novel magnetic head assembly of the type mentioned above, making use of a ferrite material of Mn-Zn system as the material of the cores of the magnetic heads.

As a measure for enhancing the magnetic recording density, it has been proposed to reduce the width of the recording track. This, however, requires a thinning of the cores, which in turn imposes various problems. Particularly, in the magnetic head assembly having a complicated construction in which the recording/reproducing magnetic head and the erasing head are incorporated in a common case, the thinning of the cores leads to serious problems such as stringent requirements for dimensional precision in the assembling of the head assembly and breakdown of the cores themselves.

Recently, in order to obviate the above-described problems of the prior art, a magnetic head assembly has been proposed and put into practical use, in which reinforcers of a non-magnetic material are bonded to the recording/reproducing magnetic head cores and the erasing magnetic head cores thereby to rigidly reinforce and stiffen these cores while enhancing the precision of distance between the recording/reproducing magnetic head and the erasing head. This type of magnetic head assembly is disclosed, for example, in Japanese Patent Publication Nos. 810/1980 and 31763/1978 (U.S. Pat. No. 3,846,840), Japanese Patent Laid-open Nos. 143217/1979 and 22816/1979 (U.S. Pat. No. 4,110,804) and Japanese Utility Model Laid-open No. 26915/1979. The magnetic head assembly of this type now actually used, however, has inferior electromagnetic conversion characteristics and does not fully meet the requirements for performance, because the cores of the magnetic heads are made from a ferrite material of Ni-Zn system. This created a demand for development of magnetic head assembly making use of a ferrite of Mn-Zn system having a higher performance as the material of the magnetic head cores. Unfortunately, however, such a magnetic head has not been put into practical use because of cracking in the glass bonding between a reinforcement member of a non-magnetic ceramic material and the core of a ferrite of Mn-Zn system for reinforcing the latter.

SUMMARY OF THE INVENTION

Under this circumstance, the present inventors have accomplished the present invention by finding out that the magnetic head assembly having cores of a ferrite of Mn-Zn system and reinforced by non-magnetic ceramic material can be successfully produced in an industrial scale, provided that the glass for bonding, ferrite of Mn-Zn system and the non-magnetic ceramics material are selected to satisfy a predetermined condition.

To this end, according to the invention, there is provided a magnetic head assembly comprising, at least, a recording/reproducing magnetic head made of an Mn-Zn ferrite, a first reinforcer made of a non-magnetic ceramic material and bonded by a glass to the recording/reproducing magnetic head in parallel with the gap formed in the recording/reproducing magnetic head, erasing magnetic heads attached to both sides of the first reinforcer so as to limit the recording width of the recording/reproducing magnetic head, and second reinforcers made of a non-magnetic ceramics material and bonded in parallel to gaps in the erasing magnetic heads, the second reinforcers being positioned at both sides of the recording/reproducing magnetic head, characterized in that the area Af defined by the thermal expansion coefficient curve of the Mn-Zn ferrite in the temperature range between the normal room temperature and the softening point of the glass and the area Ac defined by the thermal expansion coefficient curve of the first reinforcer in the same temperature range satisfy the condition of $-3.8 \times 10^{-4} \leq Af - Ac \leq 1.8 \times 10^{-4}$.

Other features and advantages of the invention will become from the following description of the preferred embodiment taken in conjunction with the accompanying drawings.

BRIEF DESCRIPTION OF THE DRAWINGS

FIG. 7 is a graph showing the relationship between the writing current and reproduction output level for each of a plurality of magnetic head materials.

DESCRIPTION OF THE PREFERRED EMBODIMENT

Before turning to the description of the preferred embodiment of the invention, a general description will be made as to the prior art in order to facilitate the understanding of the invention.

Figure 1:
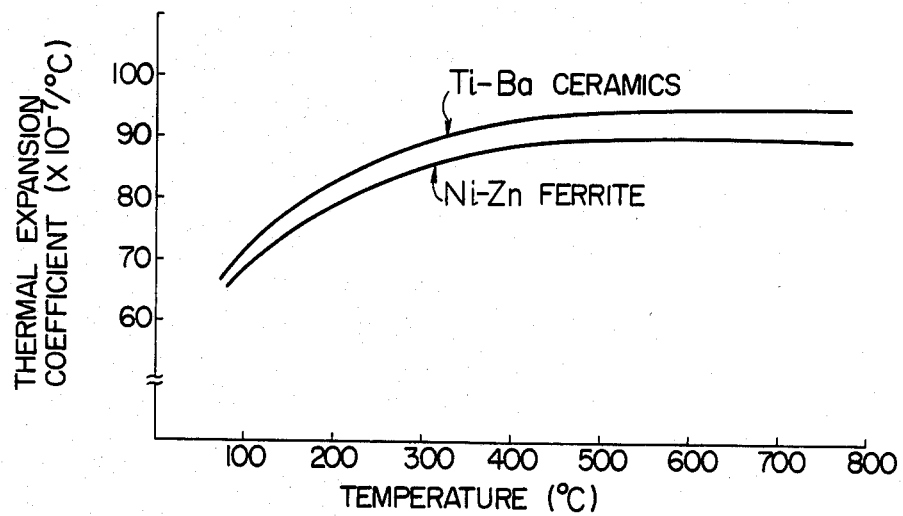
FIG. 1 is a graph showing the thermal expansion coefficients of an Ni-Zn ferrite and Ti-Ba ceramics in relation to temperature.

The conventional magnetic head makes use of an Ni-Zn ferrite as the material of the magnetic head core. Usually, Ti-Ba ceramic is used as the material of the reinforcer. The Ni-Zn ferrite and the Ti-Ba ceramics exhibit thermal expansion coefficients as shown in FIG. 1. As will be seen from this Figure, the thermal expansion coefficient curves of two materials generally resemble each other. Hitherto, therefore, it has been possible to bond two materials to each other without significant cracking and, hence, to mass-produce the magnetic heads in an industrial scale, simply by selecting the type of Ni-Zn ferrite and the kind of the Ti-Ba ceramic to minimize the difference in the thermal expansion coefficient, particularly at 400° C. at which the thermal expansion coefficients of both materials saturate.

Figure 2:
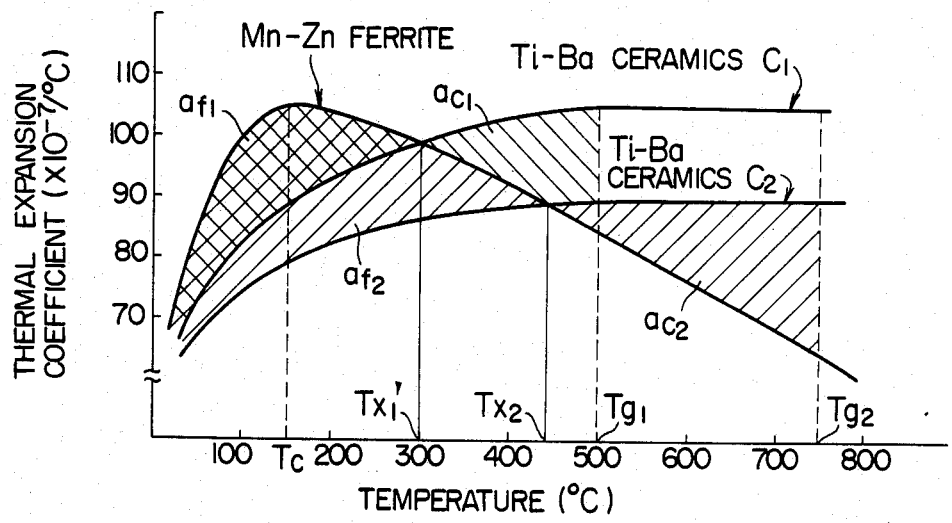
FIG. 2 is a graph showing the thermal expansion coefficients of an Mn-Zn ferrite used in the invention and Ti-Ba ceramics in relation to temperature.

In contrast, Mn-Zn ferrites generally exhibit a thermal expansion coefficient as shown in FIG. 2. Namely, the thermal expansion coefficient curve of the Mn-Zn ferrite is totally different from that of the Ni-Zn ferrite, and exhibits a maximum value of thermal expansion coefficient at a point near the curie point which generally ranges between 100° and 200° C. Therefore, when the Mn-Zn ferrite is glass-bonded to a non-magnetic ceramic such as Ti-Ba ceramic, a crack maybe generated due to a stress caused by the difference of thermal expansion coefficient between two materials in the course of cooling and solidification of the glass. Therefore, when the Mn-Zn ferrite is used as the core material which is glass-bonded to a non-magnetic ceramic, it is not possible to mass-produce the magnetic head in an industrial scale solely by selecting two materials to minimize the difference in the thermal expansion coefficient. Namely, in this case, it is necessary to suitably select all of the three materials, i.e. glass as the bonding agent, Mn-Zn ferrite and non-magnetic ceramics.

Figure 3:
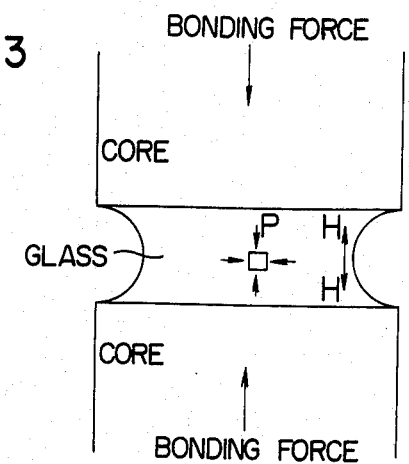
FIG. 3 is an illustration of the glass deformation which takes place when a ferrite core is glass-bonded to a ceramics core.

In order to adequately determine the solidification temperature of the glass through reasonable understanding of the mechanism of glass-bonding of two different materials, attention must be drawn to the property of the glass in relation to temperature. The glass is a thermoplastic material which exhibits continuous changes of viscosity and surface tension in relation to temperature. Therefore, when the ferrite and the ceramics are glass-bonded to each other, the internal pressure P of the glass produced by the bonding jig acts to displace the glass layer to the outside of the core gap at high temperature, as shown in FIG. 3. However, as the temperature comes down, the displacement of the glass does not occur even when the internal pressure P is increased, because the viscosity of the glass and, hence, the surface tension H of the glass are increased correspondingly. This means that, at such a low temperature, the deformations of the ferrite, ceramics and glass due to thermal contraction are restricted to generate stresses. The temperature which is the threshold for causing such restriction of deformation is considered to be the solidification point.

The viscosity of the glass changes in accordance with a change in the temperature. The rate of change varies depending on the composition of the glass. Usually, however, the temperature at which the coefficient $\eta$ of viscosity satisfies the condition of $\log_{10}\eta = 7.65$ is defined as the softening point of the glass. As a result of various experiments and studies, the present inventors have reached a conclusion that the solidification point of the glass substantially approximates the softening point of the glass and, therefore, the safe glass-bonding between an Mn-Zn ferrite and a non-magnetic ceramic material can be achieved by paying reasonable consideration to the softening point of the glass. More specifically, for attaining a safe bonding between the Mn-Zn ferrite and the non-magnetic ceramics, it is necessary to select the type of Mn-Zn ferrite, glass and the non-magnetic ceramics so as to minimize the stresses occurring in the ferrite and the ceramics in the course of the cooling from the softening point of the glass down to the normal temperature.

To explain in more detail with specific reference to FIG. 2, for glass-bonding to Mn-Zn ferrite and the non-magnetic ceramics by a glass having a softening point Tg1, it is preferred to use the non-magnetic ceramic $C_1$ which provides the smaller difference of area of thermal expansion coefficient curve in the region between the softening point Tg1 and the normal temperature. It will be seen from FIG. 2 that the areas $a_{f1}$ and $a_{c1}$ are substantially equal to each other. Similarly, when a glass having a softening point Tg2 is used as the bonding agent, it is preferred to use the non-magnetic ceramics $C_2$ which provides smaller difference of area in the temperaure range between the softening point Tg2 and the normal temperature. Namely, in this temperature range, the areas $a_{f2}$ and $a_{c2}$ are substantially equal to each other. This is the basic concept of the present invention.

As will be understood from this Figure, the temperatures $T_{x1}$ and $T_{x2}$ of the points at which the thermal expansion coefficient curves of the Mn-Zn ferrite intersect the thermal expansion coefficient curve of the non-magnetic ceramics are above the curie point Tc of the Mn-Zn ferrite but are below the softening points Tg1 and Tg2 of the glass used.

According to the result of experiment conducted by the present inventors, it has proved that the difference of areas of two thermal expansion coefficient curves can be made sufficiently small to permit the safe glass-bonding of the Mn-Zn ferrite and the non-magnetic ceramics without cracking, provided that the temperature Tx of the point at which two thermal expansion coefficient curves intersect ranges between the curie point Tc of the Mn-Zn ferrite and the softening point Tg of the glass and that the condition of $$Tc + \frac{Tg - Tc}{4} \leq Tx \leq Tc + \frac{Tg - Tc}{2}$$

is met.

Figure 4:
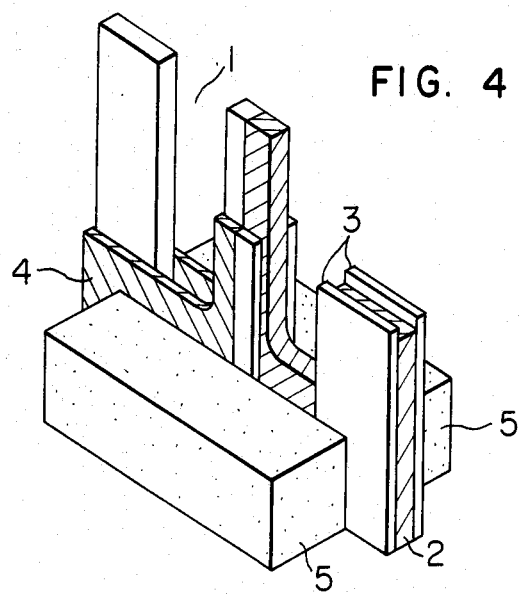
FIG. 4 is a perspective view of a core assembly for a magnetic head in accordance with the invention.
Figure 5:
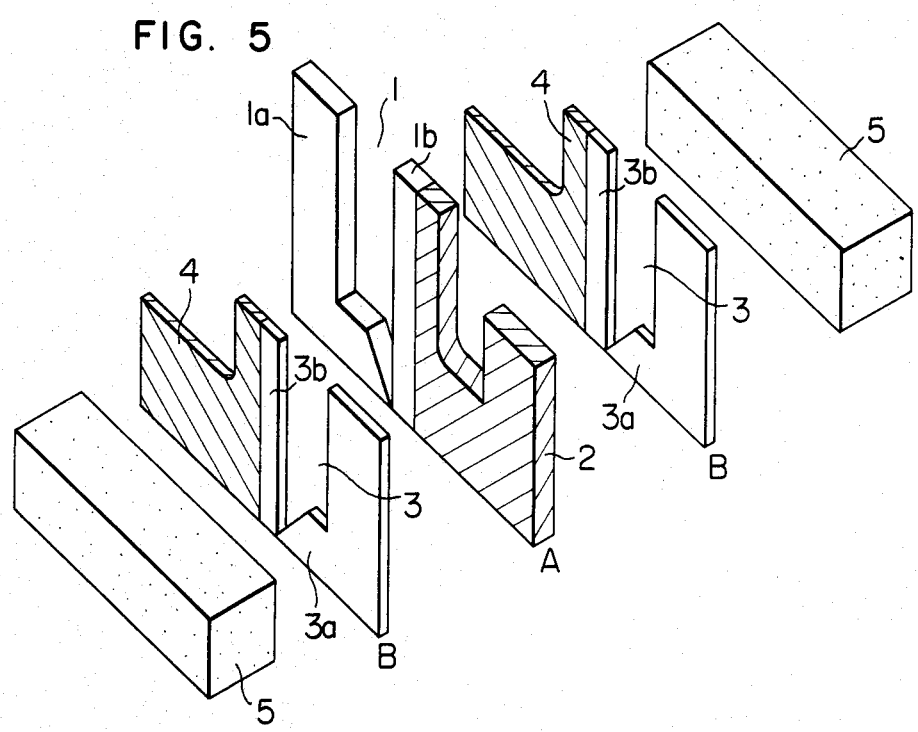
FIG. 5 is an exploded view of a core assembly shown in FIG. 4.

The invention will be fully understood from the following description of the preferred embodiment. FIG. 4 is a schematic illustration of a magnetic head assembly in accordance with an embodiment of the invention, while FIG. 5 is an exploded view of the magnetic head assembly shown in FIG. 4. In these Figures, a reference numeral 1 designates a recording/reproducing magnetic head made of an Mn-Zn ferrite. A first reinforcer 2 made of a non-magnetic ceramics is bonded by means of a glass in parallel with the magnetic gap of the magnetic head 1. In order to obtain such a construction, a block having an L-shaped cross-section as the blank of a core 1a is made from an Mn-Zn ferrite and a block having an I-shaped cross-section as the blank of a core 1b made of an Mn-Zn ferrite are positioned to about each other to form a predetermined magnetic gap therebetween, and are united with each other by glass-bonding. Then, a block of a non-magnetic ceramic and having a U-shaped cross-section as the blank of the reinforcer 2 is positioned to about the united block in parallel with the magnetic gap of the united block. Then, both blocks are glass-bonded to each other and the integrated block in one body is cut at a predetermined width and finally polished to become a magnetic head assembly.

In FIGS. 4 and 5, a reference numeral 3 designates an erasing head which is composed of an L-shaped core 3a and an I-shaped core 3b arranged to abut each other to form a predetermined magnetic gap and glass-bonded to each other. An L-shaped second reinforcer 4 made of a non-magnetic ceramic is glass-bonded in parallel to the magnetic gap of the erasing head 3. When the erasing magnetic head 3 is made from an Mn-Zn ferrite, the type of material of the magnetic head and the second reinforcer should be selected taking into account the glass softening point as in the case of the recording/reproducing magnetic head mentioned above. However, if the erasing magnetic head 3 is made from an Ni-Zn ferrite, it suffices only to select the kind of the ferrite and the non-magnetic ceramic so as to minimize the difference of thermal expansion coefficient at a specific temperature, e.g. 400° C., without paying attention to the glass softening point. Reference numerals 5 denote side plates.

Thus, as will be clearly seen from FIG. 5, the second reinforcers 4 are positioned at both sides of the recording/reproducing magnetic head 1, while the erasing magnetic heads 3 are positioned at both sides of the the first reinforcer 2 bonded in parallel to the gap of the recording/reproducing magnetic head 1. The side plates 5 are placed at the outer sides of respective erasing heads 3. These members are integrated by means of glass or resin to form the magnetic head assembly as shown in FIG. 4. In making the glass-bonding between the united block of the Mn-Zn ferrite and the block of the non-magnetic ceramic, the type of non-magnetic ceramic is selected taking into account the softening point Tg of the glass such that the difference between the area Af of the thermal expansion coefficient curve of the Mn-Zn ferrite in the temperature range between the normal temperature and the glass softening point Tg and the area Ac of the thermal expansion coefficient curve of the non-magnetic ceramic in the same temperature range satisfies the condition of $-3.8\times10^{-4}\leq Af-Ac\leq1.8\times10^{-4}$. The area Af is the area which is defined, when the glass having softening point Tg is used, by the thermal expansion coefficient curve of the Mn-Zn ferrite, line of T=Tg1 and the lower temperature axis, i.e., the axis of abscissa.

Table 1 shows the properties of various magnetic head assemblies produced by using Mn-Zn ferrites of different compositions as the materials of the recording/reproducing head and erasing heads and various non-magnetic ceramics as the material of the reinforcers, through glass-bonding by various glasses having different softening points. More specifically, in Table 1, sample Nos. 1 to 24 are the magnetic head assemblies in which a resin is used for the bonding between a unit consisting of the recording/reproducing magnetic head and units consisting of the erasing heads and the second reinforcers, and between the second-mentioned units and the side plates 5, while sample Nos. 25 to 40 are the magnetic head assemblies in which the bonding mentioned above is made by glasses.

TABLE 1

| | No. | Mn—Zn ferrite composition Fe$_2$O$_3$ (mol %) | ZnO (mol %) | Glass softening point (°C.) | Average Thermal Expansion Coefficient | Test Results Crack | Magnetic property | Difference of $A_F - A_C \times 10^{-4}$ |
|---|---|---|---|---|---|---|---|---|
| | 1 | 51 | 17 | 330 | $110 \times 10^{-7}$ | ◎ | ◎ | 0.2 |
| | 2 | " | " | " | $95 \times 10^{-7}$ | △ | ◎ | 1.7 |
| | 3 | " | " | " | $90 \times 10^{-7}$ | x | x | 2.4 |
| | 4 | " | " | " | $85 \times 10^{-7}$ | x | x | 3.1 |
| | 5 | 53 | 22 | 380 | $110 \times 10^{-7}$ | ◎ | ◎ | 0.3 |
| | 6 | " | " | " | $95 \times 10^{-7}$ | ○ | ◎ | 1.6 |
| | 7 | " | " | " | $90 \times 10^{-7}$ | x | x | 2.0 |
| | 8 | " | " | " | $85 \times 10^{-7}$ | x | x | 2.5 |
| | 9 | 51 | 17 | 450 | $110 \times 10^{-7}$ | ◎ | ◎ | −1.8 |
| | 10 | " | " | " | $95 \times 10^{-7}$ | △ | ◎ | 1.8 |
| | 11 | " | " | " | $90 \times 10^{-7}$ | x | x | 3.0 |
| | 12 | " | " | " | $85 \times 10^{-7}$ | x | x | 4.5 |
| | 13 | 53 | 22 | 480 | $110 \times 10^{-7}$ | ◎ | ◎ | −2.7 |
| | 14 | " | " | " | $95 \times 10^{-7}$ | ○ | ◎ | 1.5 |
| | 15 | " | " | " | $90 \times 10^{-7}$ | x | x | 3.0 |
| | 16 | " | " | " | $85 \times 10^{-7}$ | x | x | 4.6 |
| | 17 | 51 | 17 | 530 | $110 \times 10^{-7}$ | △ | ◎ | −3.5 |
| | 18 | " | " | " | $85 \times 10^{-7}$ | ◎ | ◎ | 1.4 |
| | 19 | " | " | " | $115 \times 10^{-7}$ | x | x | −5.0 |
| | 20 | " | " | " | $80 \times 10^{-7}$ | x | x | 2.5 |
| RESIN | 21 | 53 | 22 | 560 | $110 \times 10^{-7}$ | △ | ◎ | −3.8 |
| ↓ | 22 | " | " | " | $85 \times 10^{-7}$ | ◎ | ◎ | 1.5 |
| ↓ | 23 | " | " | " | $115 \times 10^{-7}$ | x | x | −4.8 |
| ↓ | 24 | " | " | " | $80 \times 10^{-7}$ | x | x | 2.5 |
| GLASS | 25 | 51 | 17 | 620 | $105 \times 10^{-7}$ | △ | ◎ | −3.5 |
| | 26 | " | " | " | $90 \times 10^{-7}$ | ◎ | ◎ | 0.8 |
| | 27 | " | " | " | $110 \times 10^{-7}$ | x | x | −4.4 |
| | 28 | " | " | " | $75 \times 10^{-7}$ | x | x | 3.5 |
| | 29 | 53 | 22 | 680 | $105 \times 10^{-7}$ | △ | ◎ | −3.8 |
| | 30 | " | " | " | $90 \times 10^{-7}$ | ◎ | ◎ | 0.5 |
| | 31 | " | " | " | $110 \times 10^{-7}$ | x | x | −5.2 |
| | 32 | " | " | " | $75 \times 10^{-7}$ | x | x | 4.1 |
| | 33 | 51 | 17 | 720 | $100 \times 10^{-7}$ | △ | ◎ | −3.6 |
| | 34 | " | " | " | $85 \times 10^{-7}$ | ◎ | ◎ | 0.4 |
| | 35 | " | " | " | $105 \times 10^{-7}$ | x | x | −5.0 |
| | 36 | " | " | " | $75 \times 10^{-7}$ | x | x | 3.0 |
| | 37 | 53 | 22 | 780 | $100 \times 10^{-7}$ | △ | ◎ | −3.8 |
| | 38 | " | " | " | $85 \times 10^{-7}$ | ◎ | ◎ | −0.1 |
| | 39 | " | " | " | $105 \times 10^{-7}$ | x | x | −5.1 |
| | 40 | " | " | " | $75 \times 10^{-7}$ | x | x | 2.5 |

In Table 1 under "Crack" the symbol ◎ denotes no cracks, ○ denotes very few cracks, △ denotes a number of cracks and X denotes many cracks. Under "Magnetic property," the symbol ◎ denotes excellent, ○ denotes good, △ denotes not good and X denotes bad.

As will be clearly understood from Table 1, no crack is formed in the magnetic head assemblies having such combinations of the Mn-Zn ferrite and the non-magnetic ceramics that the difference between the areas Af and Ac formed by respective thermal expansion coefficient curves satisfies the condition of $-3.8\times10^{-4}\leq Af-Ac\leq1.8\times10^{-4}$.

Thus, it is understood that the magnetic head assemblies having such combinations are excellent. Superior magnetic property is exhibited particularly by the magnetic head assembly in which the Mn-Zn ferrite has a composition consisting essentially of 50 to 55 mol% of FeO$_2$O$_3$, 16 to 25 mol% of ZnO and the balance substantially MnO. Although only the Mn-Zn ferrites consisting essentially of Fe$_2$O$_3$, ZnO and MnO are shown, needless to say, the Mn-Zn ferrite used in the invention does not exclude the addition of various additives such as metals having low melting points, e.g. B, Bi and As or oxides thereof, oxides of V, Ca, Si or the like, and oxides of rare earth metal.

It is understood from Table 1 also that, when a resin is used in the bonding between a unit having the recording/reproducing magnetic head and a unit having the erasing head, the magnetic head assemblies exhibit excellent performance, provided that the glass used has a softening point ranging between 400° and 600° C. and that the mean value of the thermal expansion coefficient of the non-magnetic ceramic in the temperature range between 0° and 400° C. ranges between $90 \times 10^{-7}$ and $120 \times 10^{-7}$. When a glass is used for the bonding between the units, superior performance of the magnetic head assembly is attained on condition that the softening point of the first glass used in the bonding between the recording/reproducing head and the first reinforcer or the softening point of a second glass used for the bonding between the erasing magnetic head and the second reinforcer (the second glass is in some case identical to the first glass) ranges between 600° and 800° C. and that the mean value of the thermal expansion coefficient of the non-magnetic ceramic material in the temperature range between 0° and 400° C. ranges between $80 \times 10^{-7}$ and $105 \times 10^{-7}$. In this case, it is possible to avoid any softening of the first and second glasses during the assembling by using, as the third glass for bonding the units with one another, a glass having a softening point lower than those of the first and the second glasses. By so doing, it is possible to obviate any change in the size of the gap attributable to the softening of the first and the second glasses and, hence, to obtain a magnetic head assembly having a high performance.

Figure 6:
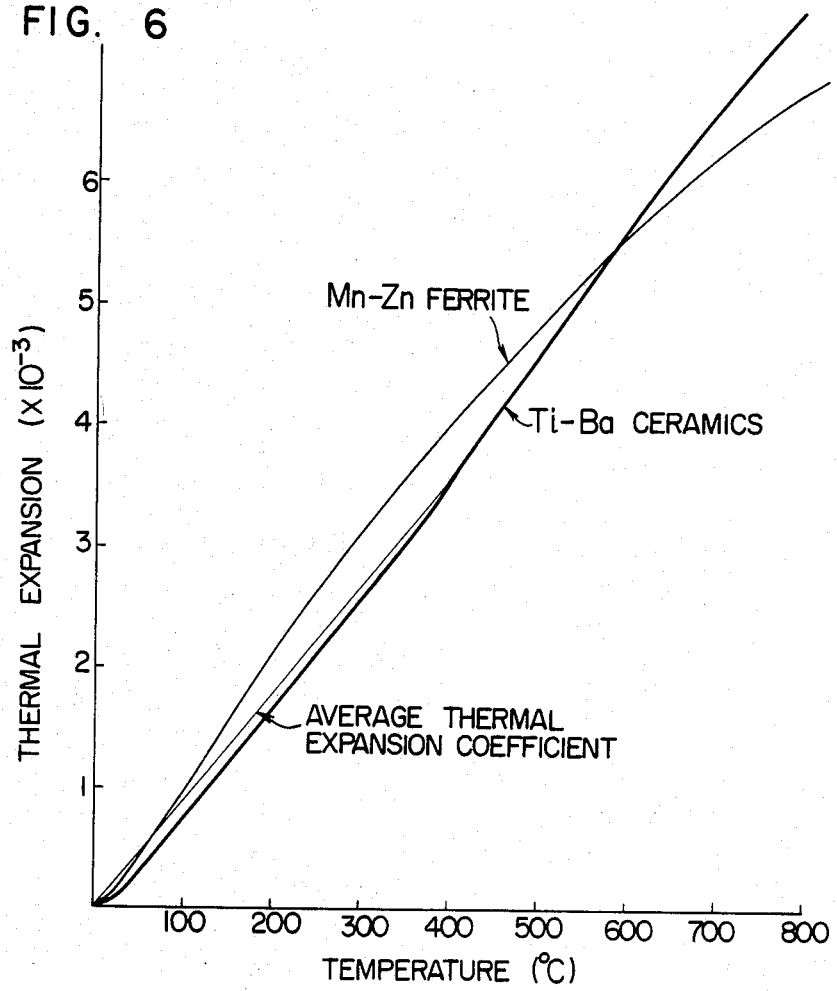
FIG. 6 is a graph showing the termal expansion of an Mn-Zn ferrite used in the invention together with the thermal expansion of Ti-Ba ceramics.

The mean value of the thermal expansion coefficient of the non-magnetic ceramics in the temperature range between 0° and 400° C., appearing in Table 1, is the value as obtained through dividing the thermal expansion amount of the Ti-Ba ceramics at, for example, 400° C. by the temperature as shown in FIG. 6, i.e. the gradient of the straight line interconnecting the point representing the thermal expansion at 400° C. and the zero point in the expansion-temperature curve.

FIG. 7 shows the relationship between the writing current and the level of the reproduction output as attained by recording/reproducing magnetic heads of Mn-Zn ferrites of different compositions in comparison with that attained with a recording/reproduction head made of an Ni-Zn ferrite. These relationships were obtained by supplying a writing current of a predetermined frequency to the recording coil of the magnetic head to magnetize a recording medium after a complete deenergization of the medium by A.C. current, stopping the current supply to the recording coil, moving the magnetic head along the magnetized path of the medium relatively to the latter, and ploting the level of the reproduction output induced in the coil in relation to the electric current value.

When the writing current is small, the reproduction output is also small because the magnetic flux energing from the magnetic gap of the magnetic head is too small to magnetize the medium sufficiently. To the contrary, if the writing current is too large, a magnetic saturation occurs in the area around the magnetic gap in the magnetic head to increase the effective size of the magnetic gap, so that the magnetic flux necessary for the writing cannot be obtained on the magnetic gap. It is, therefore, understood that there must be a point at which the reproduction output is maximized in relation to the writing current.

The reproduction output is the voltage which is induced in the reproduction coil. Provided that the number of turns of coil winding is equal, it is preferred to collect as many magnetic fluxes as possible from the magnetized portion of the recording medium. The material capable of collecting many magnetic fluxes is the material having a high magnetic permeability. From FIG. 7, it will be seen that the Mn-Zn ferrite having a composition consisting essentially of 50 to 55 mol% of Fe$_2$O$_3$, 16 to 25 mol% of ZnO and the balance MnO provides the higher level of the reproduction output than that presented by the Mn-Zn ferrite having a composition consisting essentially of 56 to 60 mol% of Fe$_2$O$_3$, 5 to 15 mol% of ZnO and the balance MnO, because the former exhibits a higher magnetic permeability than the latter. The former Mn-Zn ferrite exhibits a higher magnetic permeability than the conventionally used Ni-Zn ferrite and, hence, a higher level of the reproduction output. This means that the former Mn-Zn ferrite offers a high density of recording when used as the material of the magnetic head.

What is claimed is:

1. A magnetic head assembly comprising:
   a read/write magnetic head disposed to read and write data, said magnetic head consisting essentially of a Mn-Zn ferrite, and having a magnetic gap formed therein;
   a first reinforcing member comprised of a non-magnetic ceramic material bonded by a glass to said magnetic head such that said reinforcing member is in line with said magnetic gap;
   a pair of magnetic erasing heads one of which is affixed on each side of said first reinforcing member, each of said pair of erasing heads having a magnetic gap, said erasing heads limiting the width of data written by said read/write magnetic head;
   a pair of second reinforcing members comprised of a non-magnetic ceramic material, each of said second reinforcing members being bonded to one of said erasing heads with each of said second reinforcing members being in line with the magnetic gap of the adjacent erasing head and on either side of said read/write magnetic head, wherein the area (Af) defined by the thermal expansion coefficient curve of said Mn-Zn ferrite in the temperature range between room temperature and the softening point of said glass and the area (Ac) defined by the thermal expansion coefficient curve of said non-magnetic material comprising said first reinforcing member in the same temperature range satisfy the following condition:

$-3.8 \times 10^{-4} \leq Af - Ac \leq 1.8 \times 33\ 10^{-4}$.

2. A magnetic head assembly according to claim 1, wherein the temperature (Tx) of the point at which the thermal expansion coefficient curves of said Mn-Zn ferrite and the non-magnetic material comprising said first reinforcing member intersect is above the curie point (Tc) of said Mn-Zn ferrite and below the softening point (Tg) of said glass, and wherein the following condition is met:

$$Tc + \frac{Tg - Tc}{4} \leq Tx \leq Tc + \frac{Tg - Tc}{2}$$

3. A magnetic head assembly according to either one of claims 1 or 2, wherein said second reinforcing members are bonded to said erasing heads with a glass, said erasing magnetic heads consisting essentially of an Mn-Zn ferrite, and wherein the area (A'f) defined by the thermal expansion coefficient curve of said Mn-Zn ferrite comprising said erasing heads in the temperature range between room temperature and the softening point of said glass for bonding said erasing magnetic heads to said second reinforcing members and the area (A'c) defined by the thermal expansion coefficient curve of said second reinforcing members in the same temperature range satisfy the following condition:

$$-3.8 \times 10^{-4} \leq A'f - A'c \leq 1.8 \times 10^{-4}.$$

4. A magnetic head assembly according to claim 3, wherein the temperature (T'x) of a point at which the thermal expansion coefficient curve of said Mn-Zn ferrite comprising said erasing heads and the thermal expansion coefficient curve of said non-magnetic ceramic material comprising said second reinforcing members intersect is above the curie point (T'c) of said Mn-Zn ferrite comprising said erasing heads and below the softening point (T'g) of said glass bonding said erasing heads to said second reinforcing members, and wherein the following condition is met:

$$T'c + \frac{T'g - T'c}{4} \leq T'x \leq T'c + \frac{T'g - T'c}{2}$$

5. A magnetic head assembly according to claim 1, wherein said Mn-Zn ferrite has a composition consisting essentially of 50 to 55 mol% of $Fe_2O_3$, 16 to 25 mol% of ZnO and the balance substantially MnO.

6. A magnetic head assembly according to claim 5, wherein said second reinforcing members are bonded to said erasing heads with a glass and wherein the softening point of said glass bonding said second reinforcing members to said erasing heads ranges between 600° and 800° C., and the mean value of the thermal expansion coefficient of said non-magnetic material comprising said reinforcing members selected from the group consisting of said first reinforcing member, said second reinforcing members and both said first and second reinforcing members at the temperature range between 0° and 400° C. ranges between $80 \times 10^{-7}$ and $105 \times 10^{-7}$/°C.

7. A magnetic head assembly according to claim 6, wherein said read/write magnetic head and said second reinforcing members and said erasing heads and said second reinforcing member are bonded to one another with a glass having a softening point below the softening points of the glass used for the bonding between said read/write magnetic head and said first reinforcing member and the glass used in bonding said erasing heads to said second reinforcing members.

8. A magnetic head assembly according to claim 5, wherein said glass has a softening point in the range between 400° to 600° C. and the mean value of the thermal expansion coefficient of said non-magnetic ceramic material of said reinforcing members selected from the group consisting of said first reinforcing member, and second reinforcing members and both said first and second reinforcing members is in the range between $90 \times 10^{-7}$/°C. in the temperature range between 0° and 400° C.

9. A magnetic head assembly according to claim 8, wherein said read/write magnetic head and said second reinforcing members and said erasing magnetic heads and said second reinforcing member are bonded to one another with a bonding composition consisting essentially of a resin.

* * * * *